US012614647B2

(12) United States Patent
Hagimoto et al.

(10) Patent No.: US 12,614,647 B2
(45) Date of Patent: Apr. 28, 2026

(54) BUSBAR AND METHOD OF MANUFACTURING THE SAME

(71) Applicant: HONDA MOTOR CO., LTD., Tokyo (JP)

(72) Inventors: Takahiro Hagimoto, Saitama (JP); Kenji Kimura, Aichi (JP)

(73) Assignee: HONDA MOTOR CO., LTD, Tokyo (JP)

(*) Notice: Subject to any disclaimer, the term of this patent is extended or adjusted under 35 U.S.C. 154(b) by 113 days.

(21) Appl. No.: 18/583,886

(22) Filed: Feb. 22, 2024

(65) Prior Publication Data

US 2024/0331892 A1 Oct. 3, 2024

(30) Foreign Application Priority Data

Mar. 31, 2023 (JP) ................................ 2023-056901

(51) Int. Cl.
*H01B 5/02* (2006.01)
*H01B 5/00* (2006.01)
*H01B 13/00* (2006.01)

(52) U.S. Cl.
CPC ............... *H01B 5/002* (2013.01); *H01B 5/02* (2013.01); *H01B 13/0036* (2013.01)

(58) Field of Classification Search
CPC ........................................................ H01B 5/02
See application file for complete search history.

(56) References Cited

U.S. PATENT DOCUMENTS 4,878,862 A * 11/1989 Wise .................... H01R 25/162 439/787
5,416,972 A 5/1995 Sugiura et al.
(Continued)

FOREIGN PATENT DOCUMENTS

JP H06176847 A 6/1994
JP 2014079093 A 5/2014
(Continued)

OTHER PUBLICATIONS

Decision of Refusal issued Jan. 28, 2025 in the JP Patent Application No. 2023-056901.
(Continued)

*Primary Examiner* — Chau N Nguyen
(74) *Attorney, Agent, or Firm* — CKC & PARTNERS CO., LLC

(57) ABSTRACT

The objective is to connect a busbar, which electrically connects a first power transmission target and a second power transmission target, to a cooling section in a way that allows heat transfer without the need for a terminal block. The busbar electrically connects the first power transmission target and the second power transmission target. The busbar includes a first part, a second part, and a third part. The first part is electrically connected to the first power transmission target. The second part protrudes from the first part and is electrically connected to the second power transmission target. The third part protrudes from the first part separately from the second part and contacts the cooling section in a state where the first part is electrically connected to the first power transmission target and the second part to the second power transmission target.

4 Claims, 3 Drawing Sheets

(56) References Cited

U.S. PATENT DOCUMENTS

| | | | | |
|---|---|---|---|---|
| 8,546,689 | B2 * | 10/2013 | Andersen | H02J 9/04<br>174/68.2 |
| 9,536,671 | B2 * | 1/2017 | Ramm | H01G 4/224 |
| 2014/0370339 | A1 * | 12/2014 | Kim | F28D 15/0233<br>429/72 |
| 2019/0074557 | A1 * | 3/2019 | Shin | H01M 10/6553 |
| 2021/0218237 | A1 * | 7/2021 | Dube | H02G 5/10 |

FOREIGN PATENT DOCUMENTS

| | | | |
|---|---|---|---|
| JP | 2019103247 | A | 6/2019 |
| JP | 2020005328 | A | 1/2020 |

OTHER PUBLICATIONS

Notification of Reasons for Refusal issued Nov. 5, 2024 in the JP Patent Application No. JP2023-056901.

* cited by examiner

<COMPARATIVE EXAMPLE>

<COMPARATIVE EXAMPLE>

BUSBAR AND METHOD OF MANUFACTURING THE SAME

This application is based on and claims the benefit of priority from Japanese Patent Application No. 2023-056901, filed on 31 Mar. 2023, the content of which is incorporated herein by reference.

BACKGROUND OF THE INVENTION

Field of the Invention

The present invention relates to a busbar that electrically connects power transmission targets.

Related Art

Busbars typically electrically connect a predetermined first power transmission target to a separate second power transmission target.

Patent Document 1: Japanese Unexamined Patent Application, Publication No. 2019-103247

SUMMARY OF THE INVENTION

The inventors have considered cooling such a busbar by connecting a part of the busbar to a cooling section via a cooling terminal block in a way that allows heat transfer. However, the inventors have recognized the following problems with this approach.

Namely, a cooling terminal block is required separately from the busbar, necessitating additional space for installing the cooling terminal block, which leads to an overall increase in the size of the device including the busbar. Furthermore, the increase in the number of components complicates the assembly operation of the busbar and its peripheral members, leading to increased costs.

In light of the above situation, the present invention has been made with the objective of connecting a busbar, which electrically connects a first power transmission target and a second power transmission target, to the cooling section in a way that allows heat transfer without the need for a terminal block.

The inventors have found that the objective can be achieved by ensuring that the busbar itself contacts the cooling section in the state where the busbar electrically connects the first power transmission target and the second power transmission target. The present invention encompasses the busbar as described below in (1) to (4), and the method of manufacturing the busbar as described below in (5).

(1) A busbar that electrically connects a first power transmission target and a second power transmission target, in which the busbar includes:

- a first part electrically connected to the first power transmission target;
- a second part protruding from the first part and electrically connected to the second power transmission target; and
- a third part protruding from the first part separately from the second part and contacting a cooling section in a state where the first part is electrically connected to the first power transmission target and the second part is electrically connected to the second power transmission target.

According to the present embodiment, in the state where the first part is electrically connected to the first power transmission target and the second part is electrically connected to the second power transmission target, the third part, protruding from the first part separately from the second part, contacts the cooling section. Therefore, the busbar, which electrically connects the first power transmission target and the second power transmission target, can be connected to the cooling section in a way that allows heat transfer without the need for a terminal block.

(2) The busbar as described above in (1), in which the cooling section includes a cooling section body as an electrical conductor, and a heat transfer sheet as an insulator interposed between the cooling section body and the third part.

According to the present embodiment, even if the cooling section body is an electrical conductor, the interposition of a heat transfer sheet as an insulator ensures that the busbar can be connected to the cooling section body in a way that allows heat transfer, while maintaining the insulation between the busbar and the cooling section body.

(3) The busbar as described above in (1) or (2), in which the first part is shaped to extend in the Y+ direction as one way of the predetermined Y direction from a portion

- electrically connected to the first power transmission target, and then extend in the Z− direction as one way of the Z direction orthogonal to the Y direction,
- the second part and the third part protrude from the tip of a portion of the first part extending in the Z− direction, the second part is shaped to extend at least in the Y+ direction and reach a portion electrically connected to the second power transmission target, and
- the third part is shaped to extend at least continuously in the Z− direction from the tip and reach a portion that contacts the cooling section.

With this configuration, in addition to the second and third parts extending from the tip of the first part, the third part extends continuously in the Z− direction from the tip of the first part, providing a well-organized busbar including the first, second, and third parts.

(4) The busbar as described above in (1) or (2), in which the busbar is formed by bending a single metal sheet.

With this configuration, the positions of the second and third parts relative to the first part can be easily adjusted by adjusting the bending positions.

(5) A method of manufacturing a busbar that electrically connects a first power transmission target and a second power transmission target, in which the method includes the steps of:

- processing a metal sheet to be used as a material for the busbar, the metal sheet including a first region, a second region protruding from the first region, and a third region protruding from the first region separately from the second
- region, forming a first part which is electrically connected to the first power transmission target, by bending the first region, forming a second part which is electrically connected to the second power transmission target, by bending the second region, and
- forming a third part which contacts a cooling section in a state where the first part is electrically connected to the first power transmission target and the second part is electrically connected to the second power transmission target, by bending the third region.

The busbar as described in (4) can be manufactured by this manufacturing method.

As described above, the busbar of (1), which electrically connects the first power transmission target and the second power transmission target, can be connected to the cooling section in a way that allows heat transfer without the need for a terminal block. Furthermore, the busbar as described in (2) to (4), which quote the busbar of (1), and the method of manufacturing the busbar of (4) as described in (5), each achieve additional effects.

DETAILED DESCRIPTION OF THE INVENTION

Hereinafter, embodiments of the present invention will be described with reference to the drawings. However, the present invention is not limited to these embodiments and can be modified within the spirit and scope of the present invention.

First Embodiment

Figure 1:
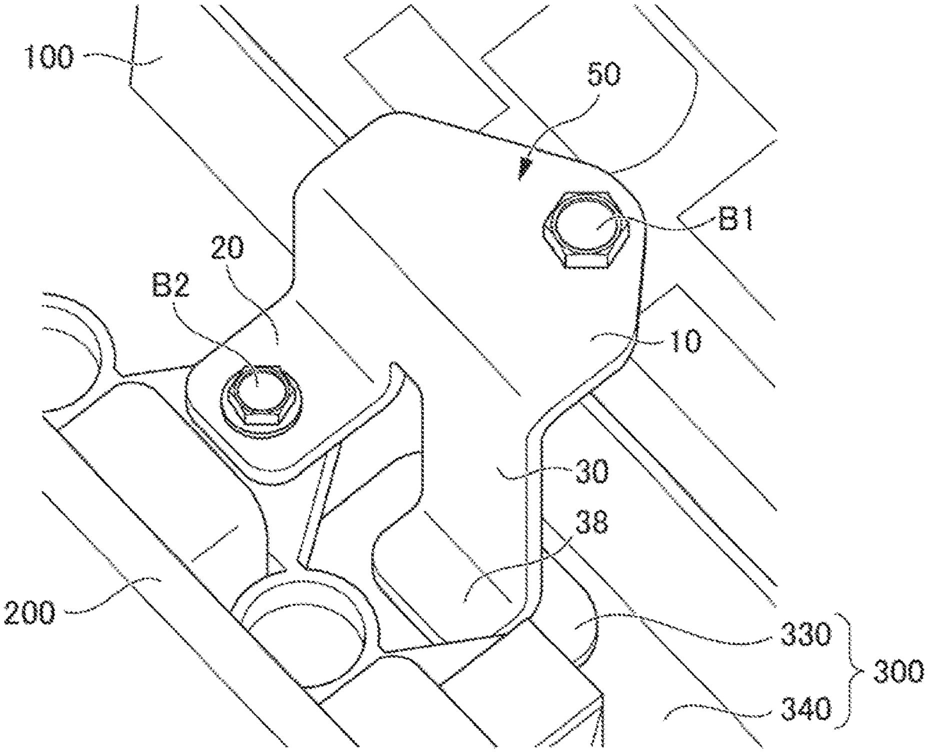
FIG. 1 is a perspective view illustrating a busbar and its surroundings according to a first embodiment.

As illustrated in FIG. 1, a busbar 50 of the present embodiment is an electrical conductor such as a metal and electrically connects a first power transmission target 100 and a second power transmission target 200. The first power transmission target 100 and the second power transmission target 200 can be, for example, batteries, various electrical devices, wiring connected thereto, etc. Examples of electrical devices include transformers, inverters, control devices, etc.

The busbar 50 includes a first part 10, a second part 20, and a third part 30. The first part 10 is electrically connected to the first power transmission target 100. The second part 20 is electrically connected to the second power transmission target 200.

Figure 2:
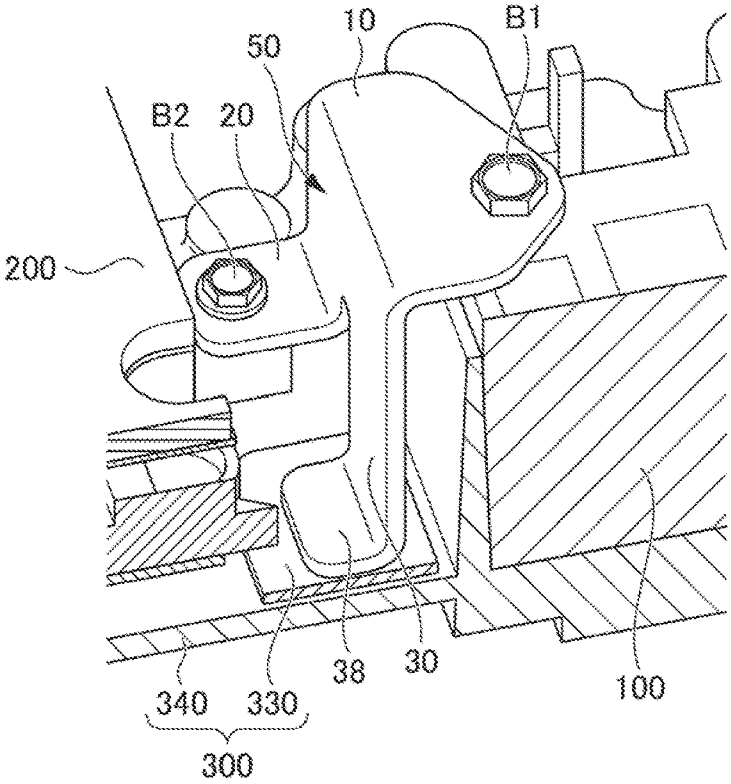
FIG. 2 is a perspective view illustrating the busbar and its surroundings, viewed from an angle different from FIG. 1.

As illustrated in FIG. 2, the third part 30 contacts the cooling section 300 in the state where the first part 10 is electrically connected to the first power transmission target 100 and the second part 20 is electrically connected to the second power transmission target 200. The cooling section 300 includes a cooling section body 340 as an electrical conductor, and a heat transfer sheet 330 as an insulator interposed between the cooling section body 340 and the third part 30.

Figure 3:
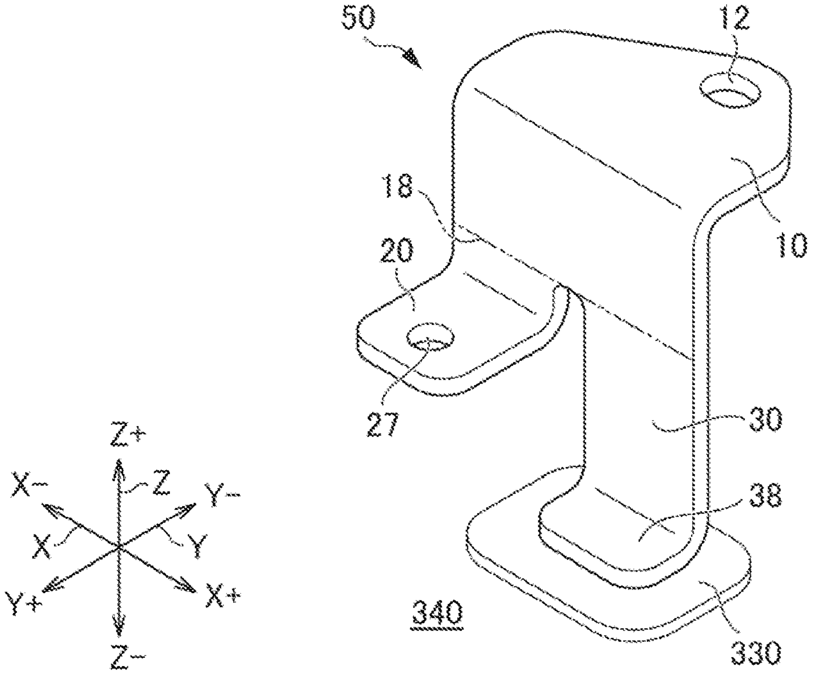
FIG. 3 is a perspective view illustrating the busbar and a heat transfer sheet.

Hereinafter, as illustrated in FIG. 3, three orthogonal directions are referred to as the "X direction", "Y direction", and "Z direction". The one way in the X direction is referred to as "X+ direction", and its opposite as "X− direction". Similarly, one way in the Y direction is referred to as "Y+ direction", and its opposite as "Y-direction". Also, one way in the Z direction is referred to as "Z+ direction", and its opposite as "Z− direction".

The first part 10 has a first through-hole 12 for passing a first bolt B1 in the Z direction. The area around this first through-hole 12 corresponds to a portion that is electrically connected to the first power transmission target 100. The first part 10 has a shape that extends in the Y+ direction, and then in the Z− direction from the portion where the first through-hole 12 is formed. Hereinafter, the Z− direction end of the portion of the first part 10 extending in the Z− direction is referred to as the "tip 18 of the first part 10".

The second part 20 and the third part 30 are arranged in the X direction and protrude separately from the tip 18 of the first part 10.

Specifically, the second part 20 has a shape that extends continuously in the Z− direction in some degree from the portion of the tip 18 of the first part 10 closer to the X− direction, and then extends in the Y+ direction.

Alternatively, the second part 20 may extend immediately from the tip 18 of the first part 10 in the Y+ direction. The second part 20 includes a second through-hole 27 for inserting a second bolt B2. The area around this second through-hole 27 corresponds to a portion that is electrically connected to the second power transmission target 200.

On the other hand, the third part 30 has a shape that extends continuously in the Z− direction further than the second part 20 from the portion of the tip of the first part 10 closer to the X+ direction, and then extends in the Y+ direction. Alternatively, the third part 30 may extend in the Z− direction further than the second part 20, and then extend in the Y− direction. The portions extending in the Y+ or Y− directions correspond to a contact portion 38 that contacts the cooling section 300. Specifically, the surface of the contact portion 38 on the Z− direction side contacts the heat transfer sheet 330 of the cooling section 300.

Figure 4:
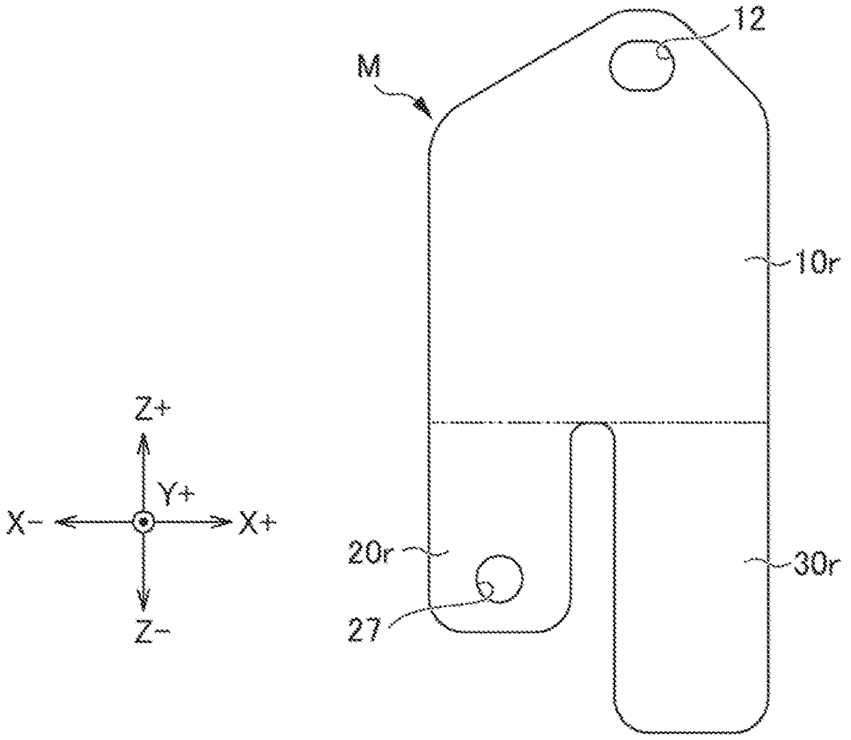
FIG. 4 is a plan view of a metal sheet that serves as the material for the busbar.

Next, the method of manufacturing the above busbar 50 is described. First, as illustrated in FIG. 4, a metal sheet M, which is a material for the busbar 50, is processed. This metal sheet M includes a first region 10*r* that becomes the first part 10, a second region 20*r* that becomes the second part 20, and a third region 30*r* that becomes the third part. The first region has a first through-hole 12, and the second region has a second through-hole 27. The second region 20*r* and the third region 30*r* are aligned in the X direction and protrude from the first region 10*r* in the Z− direction separately.

Next, each of the first region 10*r*, the second region 20*r*, and the third region 30*r* is bent. These steps may be performed simultaneously or one at a time.

In the step of bending the first region 10*r*, the portion of the first region 10*r* closer to the Z+ direction illustrated in FIG. 4 is bent 90 degrees toward the Y− direction to form the first part 10 as illustrated in FIG. 3. In the step of bending the second region 20*r*, the portion of the second region 20*r* closer to the Z− direction illustrated in FIG. 4 is bent toward the Y+ side to form the second part 20 as illustrated in FIG. 3. In the step of bending the third region 30*r*, the portion of the third region 30*r* closer to the Z− direction illustrated in FIG. 4 is bent toward the Y+ side to form the third part 30 as illustrated in FIG. 3. Through these steps, the busbar as illustrated in FIG. 3 is processed.

As illustrated in FIG. 2, in the busbar 50 thus processed, the first part 10 is electrically connected to the first power transmission target 100 by the first bolt B1, and the second part 20 is electrically connected to the second power transmission target 200 by the second bolt B2. As a result, the busbar 50 electrically connects the first power transmission target 100 and the second power transmission target 200. At this time, the contact portion 38 of the third part 30 contacts the heat transfer sheet 330 of the cooling section 300. As a result, the third part 30 is connected to the cooling section body 340 in a way that allows heat transfer through the heat transfer sheet 330. The heat transfer sheet 330 may be fixed to the cooling section body 340 with an adhesive or may be fixed by being sandwiched between the third part 30 and the cooling section body 340.

Figure 5:
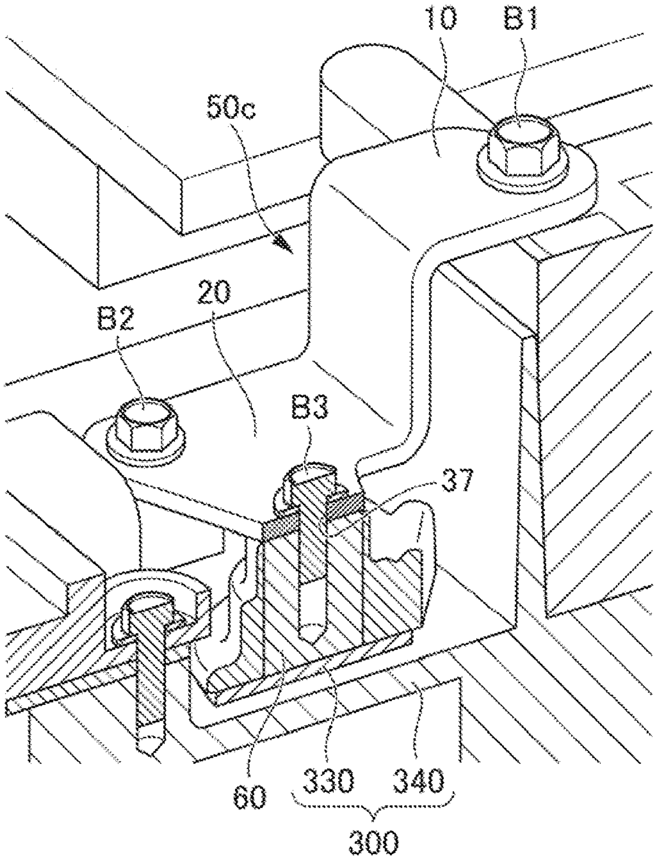
FIG. 5 is a perspective view illustrating a comparative example of a busbar and its surroundings.
Figure 6:
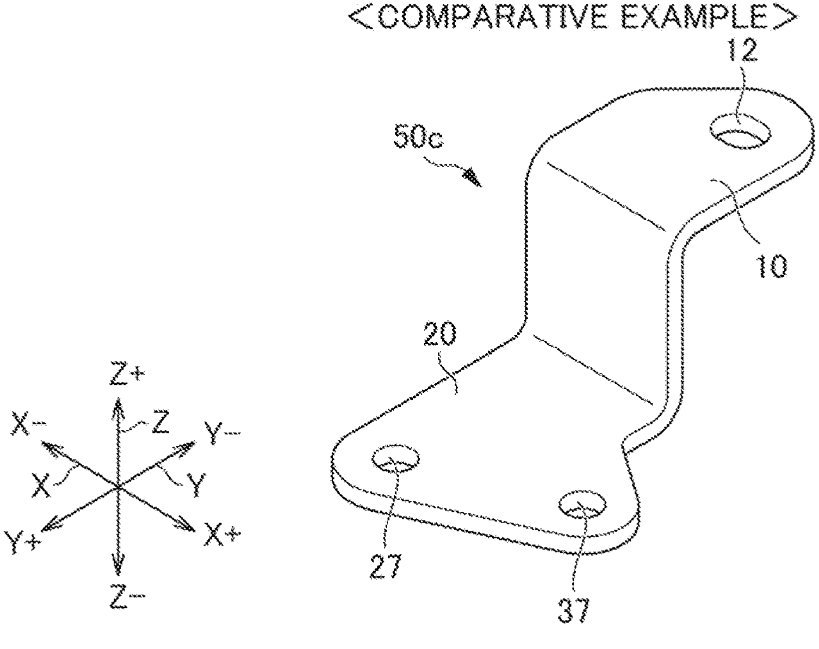
FIG. 6 is a perspective view illustrating the busbar.

The busbar 50 of the present embodiment illustrated in FIG. 3 is modified as illustrated in FIG. 6, which is hereinafter referred to as a busbar 50*c* of the comparative example. Namely, the busbar 50*c* of the comparative example is modified from the busbar 50 of the present embodiment by removing the third part 30, expanding the second part 20 in the Y+ and X+ directions, and providing a third through-hole 37 in the portion of the second part 20 closer to the X+ direction. As illustrated in FIG. 5, a third bolt B3 is inserted through this third through-hole 37. The third bolt B3 is fastened to a cooling terminal block 60, thereby connecting the second part 20 to the terminal block 60. The end of the terminal block 60 to the Z− direction side contacts the heat transfer sheet 330 of the cooling section 300. Thus, the second part 20 is connected to the cooling section 300 in a way that allows heat transfer through the terminal block 60.

Comparing with the comparative example, the structure and effects of the present embodiment are summarized below.

As illustrated in FIG. 5, according to the comparative example, the busbar 50*c*, which electrically connects the first power transmission target 100 and the second power transmission target 200, can be connected to the cooling section 300 in a way that allows heat transfer through the terminal block 60. However, the terminal block 60 is required separately from the busbar 50*c*, leading to an increase in the overall size of the device including the busbar 50*c*. Additionally, the increase in the number of components leads to complexity in the assembly operation of the busbar 50*c* and its peripheral members, resulting in increased costs. Furthermore, the fastening of the third bolt B3 is required in addition to the first bolt B1 and the second bolt B2, complicating the assembly work.

In contrast, in the present embodiment, as illustrated in FIG. 2, the third part 30 protruding from the first part 10 separately from the second part 20 contacts the cooling section 300 in the state where the first part 10 is electrically connected to the first power transmission target 100 and the second part 20 is electrically connected to the second power transmission target 200. Thus, the busbar 50, which electrically connects the first power transmission target 100 and the second power transmission target 200, can be connected to the cooling section 300 in a way that allows heat transfer without the need for the terminal block 60. This leads to a more compact overall device size including the busbar 50. Moreover, the space no longer required for installing the cooling terminal block 60 allows for a shorter distance between the first power transmission target 100 and the second power transmission target 200. This, in turn, allows for a shorter length of the busbar 50, thereby reducing electrical resistance. Additionally, fewer components simplify the assembly operation of the busbar 50 and its peripheral members, leading to cost reductions. Also, the assembly operation is simpler as it only requires fastening the first bolt B1 and the second bolt B2.

As illustrated in FIG. 2, the cooling section 300 includes the cooling section body 340 as an electrical conductor and the heat transfer sheet 330 as an insulator interposed between the cooling section body 340 and the third part 30. Therefore, even though the cooling section body 340 is an electrical conductor, the busbar 50 can be connected to the cooling section body 340 in a way that allows heat transfer through the interposed heat transfer sheet 330, while maintaining the insulation between the busbar 50 and the cooling section body 340.

As illustrated in FIG. 3, in addition to the second part 20 and the third part 30 extending from the tip 18 of the first part 10, at least the third part 30 continuously extends from the tip 18 of the first part 10 in the Z− direction. Thus, the busbar including the first part 10, the second part 20, and the third part 30 is well organized.

The busbar 50 is formed by bending a single metal sheet M as illustrated in FIG. 4. Therefore, by adjusting the bending positions, the positions of the second through-hole 27 and the contact portion 38 relative to the first through-hole 12, as illustrated in FIG. 3, can be easily adjusted.

Other Embodiments

The embodiments described above can be modified, for example, as follows. Instead of the first through-hole 12 and the second through-hole 27 illustrated in FIG. 3, notches for inserting the bolts B1 and B2 in the Z direction may be provided. The first part 10, the second part 20, and the third part 30 may be bent at angles larger or smaller than 90 degrees. The first part 10, the second part 20, and the third part 30 may have additional configurations.

EXPLANATION OF REFERENCE NUMERALS

10: first part
18: tip of first part
10*r*: first region
20: second part
20*r*: second region
30: third part
30*r*: third region
50: busbar
100: first power transmission target
200: second power transmission target
300: cooling section
330: heat transfer sheet
340: cooling section body
M: metal sheet

What is claimed is:

1. A busbar that electrically connects a first power tr mission target and a second power transmission target, the busbar comprising:

a first part electrically connected to the first power transmission target;

a second part protruding from the first part and electrically connected to the second power transmission target; and a third part protruding from the first part separately from the second part and contacting a cooling section in a state where the first part is electrically connected to the first power transmission target and the second part is electrically connected to the second power transmission target, wherein the first part is shaped to extend in a Y+ direction as one way of a predetermined Y direction from a portion electrically connected to the first power transmission target, and then extend in a Z-direction as one way of a Z direction orthogonal to the Y direction, the second part and the third part protrude from the tip of a portion of the first part extending in the Z-direction, the second part is shaped to extend at least in the Y+ direction and reach a portion electrically connected to the second power transmission target, and the third part is shaped to extend at least continuously in the Z-direction from the tin and reach a portion that contacts the cooling section.

2. The busbar according to claim 1, wherein th cooling section includes cooling section body as an electrical conductor, and a heat transfer sheet as an insulator interposed between the cooling section body and the third part.

3. The busbar according to claim 1, wherein the busbar is formed by bending a single metal sheet.

4. A method of manufacturing a bust ding to claim 1, the method comprising the steps of:

processing a metal sheet to be used as a material for the busbar, the metal sheet including a first region, a second region protruding from the first region, and a third region protruding from the first region separately from the second region, forming the first part by bending the first region, forming the second part by bending the second region, and forming the third part by bending the third region.

* * * * *